United States Patent
Marquart et al.

(10) Patent No.: US 11,301,346 B2
(45) Date of Patent: Apr. 12, 2022

(54) SEPARATE TRIMS FOR BUFFER AND SNAPSHOT

(71) Applicant: Micron Technology, Inc., Boise, ID (US)

(72) Inventors: Todd A. Marquart, Boise, ID (US); Niccolo' Righetti, Boise, ID (US); Jeffrey S. McNeil, Jr., Nampa, ID (US); Akira Goda, Setagaya (JP); Kishore K. Muchherla, Fremont, CA (US); Mark A. Helm, Santa Cruz, CA (US); Gil Golov, Backnang (DE); Jeremy Binfet, Boise, ID (US); Carmine Miccoli, Boise, ID (US); Giuseppina Puzzilli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/005,114

(22) Filed: Aug. 27, 2020

(65) Prior Publication Data
US 2022/0066898 A1     Mar. 3, 2022

(51) Int. Cl.
| | |
|---|---|
| G06F 11/00 | (2006.01) |
| G06F 11/30 | (2006.01) |
| G06F 11/14 | (2006.01) |
| G06F 11/32 | (2006.01) |
| G06F 1/30 | (2006.01) |
| G06F 11/07 | (2006.01) |

(52) U.S. Cl.
CPC ............ *G06F 11/3037* (2013.01); *G06F 1/30* (2013.01); *G06F 11/0772* (2013.01); *G06F 11/1469* (2013.01); *G06F 11/3089* (2013.01); *G06F 11/326* (2013.01); *G06F 2201/84* (2013.01)

(58) Field of Classification Search
CPC ............ G06F 11/3037; G06F 11/2053; G06F 11/2084; G06F 11/3065; G06F 1/30; G06F 2201/84
See application file for complete search history.

(56) References Cited

U.S. PATENT DOCUMENTS

| | | | |
|---|---|---|---|
| 9,857,992 B2 | 1/2018 | Pangal et al. | |
| 2007/0053222 A1* | 3/2007 | Niset .................. | G11C 16/3436 365/185.01 |
| 2020/0250902 A1* | 8/2020 | Golov ................. | B60R 21/0136 |

* cited by examiner

*Primary Examiner* — Philip Guyton
(74) *Attorney, Agent, or Firm* — Brooks, Cameron & Huebsch, PLLC

(57) ABSTRACT

A system includes a processing device and a memory device coupled to the processing device. The memory device can include a cyclic buffer portion and a snapshot portion. The processing device can store time based telemetric sensor data in the cyclic buffer portion, copy an amount of the telemetric sensor data from the cyclic buffer portion to the snapshot portion in response to a trigger event, operate the cyclic buffer portion with a first trim tailored to a performance target of the cyclic buffer portion, and operate the snapshot portion with a second trim tailored to a performance target of the snapshot portion.

18 Claims, 5 Drawing Sheets

US 11,301,346 B2

SEPARATE TRIMS FOR BUFFER AND SNAPSHOT

TECHNICAL FIELD

Embodiments of the disclosure relate generally to memory systems and more specifically relate to separate trims for buffer and snapshot.

BACKGROUND

A memory system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
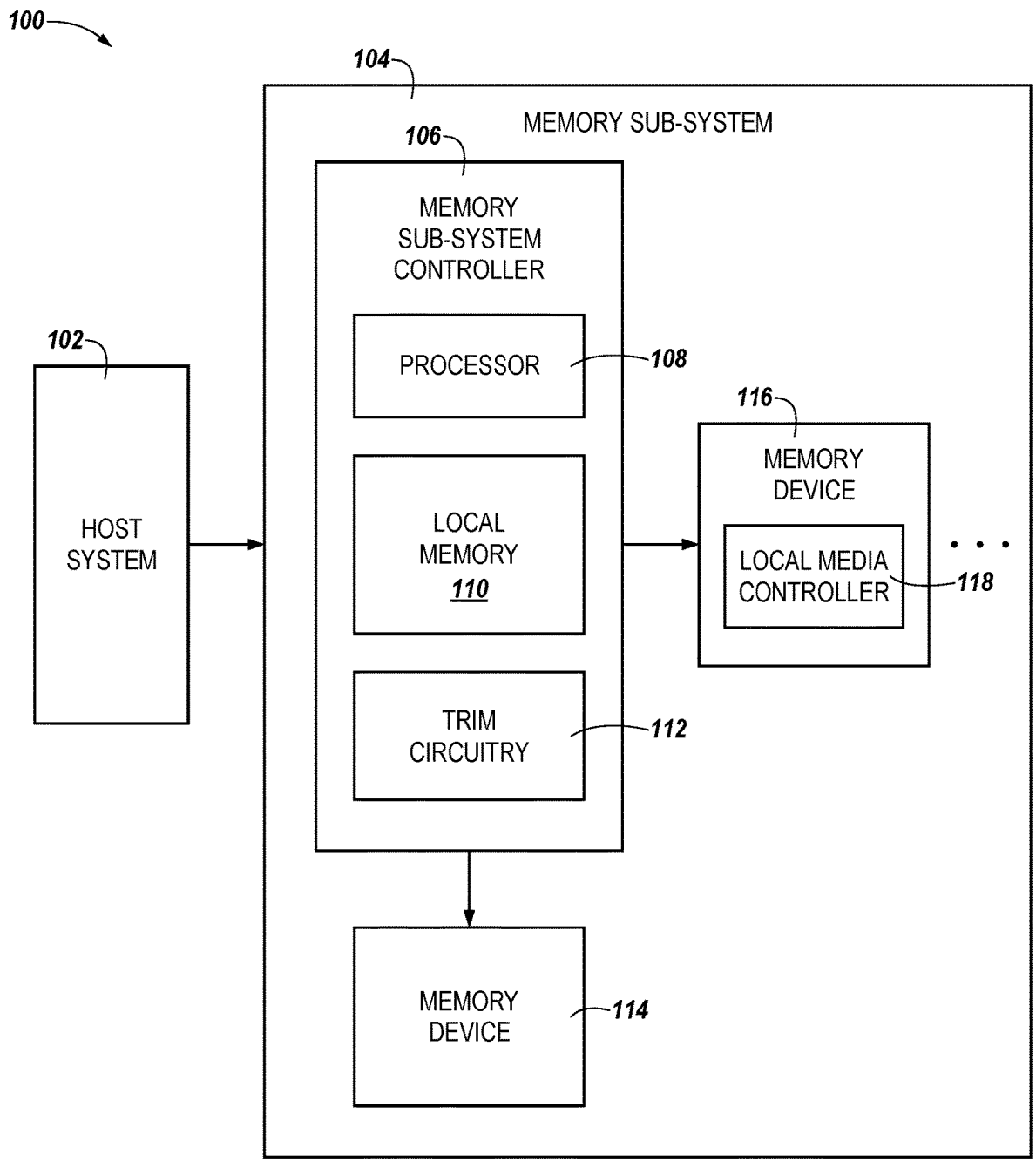
FIG. 1 illustrates an example computing system that includes a memory sub-system in accordance with some embodiments of the present disclosure.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

Aspects of the present disclosure are directed to using multiple trims tailored to performance targets for a cyclic buffer portion and a snapshot portion of a memory sub-system. A vehicle can include a memory sub-system, such as a solid state drive (SSD). The memory sub-system can be used for storage of data by various components of the vehicle, such as applications that are run by a host system of the vehicle. One examples of such an application is an event recorder of the vehicle. The event recorder may also be referred to as a "black box" or accident data recorder.

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot". An event recorder is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

Aspects of the present disclosure address the above and other storage challenges for memory sub-systems that are used as event recorders by using multiple trims tailored to performance targets for a cyclic buffer portion and a snapshot portion of the memory sub-system. The event recorder can have a cyclic buffer portion and a snapshot portion that each have different performance targets for the storage of data in the memory sub-system based on their respective needs. As such, it can be beneficial to operate the cyclic buffer portion and snapshot portion with different trims tailored to those performance targets. For example, a performance target for storage for the event recorder is significant write performance for large TBW where memory cell endurance is important because the memory cells will be subject to many program/erase cycles.

The figures herein follow a numbering convention in which the first digit or digits correspond to the drawing figure number and the remaining digits identify an element or component in the drawing. Similar elements or components between different figures can be identified by the use of similar digits. For example, 106 can reference element "06" in FIG. 1, and a similar element can be referenced as 706 in FIG. 7. Analogous elements within a Figure may be referenced with a hyphen and extra numeral or letter. Such analogous elements may be generally referenced without the hyphen and extra numeral or letter. For example, elements 604-1, 604-2, and 6046-R in FIG. 6 may be collectively referenced as 604. As used herein, the designators "B", "C", "D", "N", "P", "R", and "S", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 104 in accordance with some embodiments of the present disclosure. The memory sub-system 104 can include media, such as one or more volatile memory devices 114, one or more non-volatile memory devices 116, or a combination thereof. The volatile memory device 114 can be, but is not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a desktop computer, laptop computer, network server, mobile device, a vehicle (e.g., airplane, drone, train, automobile, or other conveyance), IoT enabled device, embedded computer (e.g., one included in a vehicle, industrial equipment, or a networked commercial device), or similar computing system that includes memory and a processing device.

The computing system 100 includes a host system 102 that is coupled to one or more memory sub-systems 104. In some embodiments, the host system 102 is coupled to different types of memory sub-systems 104. FIG. 1 illustrates an example of a host system 102 coupled to one memory sub-system 104. In at least one embodiment, the host system 102 is a computing device that controls a vehicle, such as an autonomous vehicle, and the memory sub-system 104 is an SSD that provides event recorder storage for the vehicle. For example, the memory sub-system 104 can store time based telemetric sensor data for the vehicle. Time based telemetric sensor data is defined in more detail with respect to FIG. 5. Embodiments are not limited to this example. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory device 116 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 116 include not-and (NAND) type flash memory. NAND type flash memory includes, for example, two-dimensional NAND (2D NAND) and three-dimensional NAND (3D NAND). The non-volatile memory device 116 can be another types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory device 116 can include one or more arrays of memory cells. One method of operating a memory cell includes storing one-bit per cell, which is referred to as a single level cell (SLC). The "level" refers to the quantity of states to which the cell is programed, other than an erased state (level). An SLC can be programmed to one level other than the erased level. Other methods of operating memory cells include storing more than one bit per cell, such as multi-level cells (MLCs), triple level cells (TLCs), quad-level cells (QLCs), and penta-level cells (PLCs), among others. As used herein, "multi-level cells (MLCs)" refers to a memory cell that is programmable to two levels other than an erased level. In some embodiments, the non-volatile memory device 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory device 116 can be grouped as pages that can refer to a logical unit of the memory device used to store data. With some types of memory (e.g., NAND), pages can be grouped to form blocks.

The memory sub-system controller 106 (or controller 106 for simplicity) can communicate with the non-volatile memory device 116 to perform operations such as reading data, writing data, erasing data, and other such operations at the non-volatile memory device 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processing device 108 (e.g., a processor) configured to execute instructions stored in local memory 110. In the illustrated example, the local memory 110 of the memory sub-system controller 106 is an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory device 116 and/or the volatile memory device 114. The memory sub-system controller 106 can be responsible for other operations such as wear leveling operations, error detection and/or correction operations, encryption operations, caching operations, and address translations between a logical address (e.g., logical block address) and a physical address (e.g., physical block address) associated with the non-volatile memory device 116. The memory sub-system controller 106 can further include host interface circuitry to communicate with the host system 102 via the physical host interface. The host interface circuitry can convert a query received from the host system 102 into a command to access the non-volatile memory device 116 and/or the volatile memory device 114 as well as convert responses associated with the non-volatile memory device 116 and/or the volatile memory device 114 into information for the host system 102.

In some embodiments, the non-volatile memory device 116 includes a local media controller 118 that operates in conjunction with memory sub-system controller 106 to execute operations on one or more memory cells of the non-volatile memory device 116. An external controller (e.g., memory sub-system controller 106) can externally manage the non-volatile memory device 116 (e.g., perform media management operations on the memory device 116).

In some embodiments, a memory device 116 is a managed memory device, which is a raw memory device combined with a local controller (e.g., local controller 118) for media management within the same memory device package. An example of a managed memory device is a managed NAND device.

The memory sub-system controller 106 can also include trim circuitry 112. The trim circuitry 112 can comprise an ASIC configured to perform the examples described herein. In some embodiments, a local media controller 118 of a non-volatile memory device 116 includes at least a portion of the trim circuitry 112. For example, the local media controller 118 can include a processor (e.g., processing device) configured to execute instructions stored on the memory device 114 for performing the operations described herein with respect to the trim circuitry 112. In some embodiments, the trim circuitry 112 is part of the host system 102, an application, or an operating system.

The trim circuitry 112 can be configured to cause different memory cells of the non-volatile memory device 116 to be operated with different trims. For example, memory cells of a cyclic buffer portion (e.g., cyclic buffer portion 222 illustrated in FIG. 2) can be operated with a first trim tailored to memory cell endurance and memory cells of a snapshot portion (e.g., snapshot portion 224 illustrated in FIG. 2) can be operated with a second trim tailored to data retention. Trims are sets of operating parameters, such as voltages, which can be used to operate memory cells. The trim circuitry 112 can issue or cause to be issued a set trim command, which causes the non-volatile memory device 116 (or portions thereof) to use a particular set of operating parameters to operate the memory cells of the non-volatile memory device 116. Trims can include operating parameters associated with various operations such as program (write), program verify, erase, erase verify, and sense (read), among other operations associated with an array of memory cells. Examples of trims include programming voltages, programming frequency, and programming time length.

Trims can be used to achieve or adjust desired threshold voltage (Vt) distributions and/or the voltage spread between different Vt distributions for different data states for memory cells of the non-volatile memory device 116. Trims can be used to cause the non-volatile memory device 116 to be operated with different program times. Different trims can be used for different operations such as programming, reading, and erasing, to achieve different performance targets such as programming speed, reading speed, data retention over time (how long a memory cell reliably stores the data programmed thereto), and memory cell endurance (how reliably a memory cell operates after various quantities of program/erase cycles). The effects of different trims on different performance targets can be known based on testing, historical observation, theoretical modeling, active monitoring of the operation of a memory device, and other methods. For example, a faster programming time can provide better programming speed, but can yield relatively poor data retention over time. A slower programming time can provide slower programming speed but can yield better data retention over time. A faster programming time can also provide for the ability to use a smaller or fewer hold-up capacitors to program a snapshot worth of data.

Examples of trims include a program start voltage, a program step voltage, a program inhibit start voltage, and an erase verify voltage. The program start voltage is the magnitude of an initial programming voltage pulse of a series of voltage pulses applied to a selected word line during a programming operation performed on memory cells in a selected block. The program step voltage is the voltage step size between programming voltage pulses. The program inhibit start voltage is a voltage used to inhibit further programming of memory cells once the Vt level associated with a desired data state has been reached. The erase verify voltage is the voltage used to check whether memory cells in the selected block have a Vt level indicative of the erase state.

Other examples of trims include read reference voltages and/or program verify voltages. Program verify voltages represent target voltage levels to which memory cells are to be programmed in order to represent a particular data state. Read reference voltages are voltage levels that can be located between program Vt distributions and used to determine a particular data state of a data cell during a data read operation.

The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the volatile memory device 114 and/or the non-volatile memory device 116.

Figure 2:
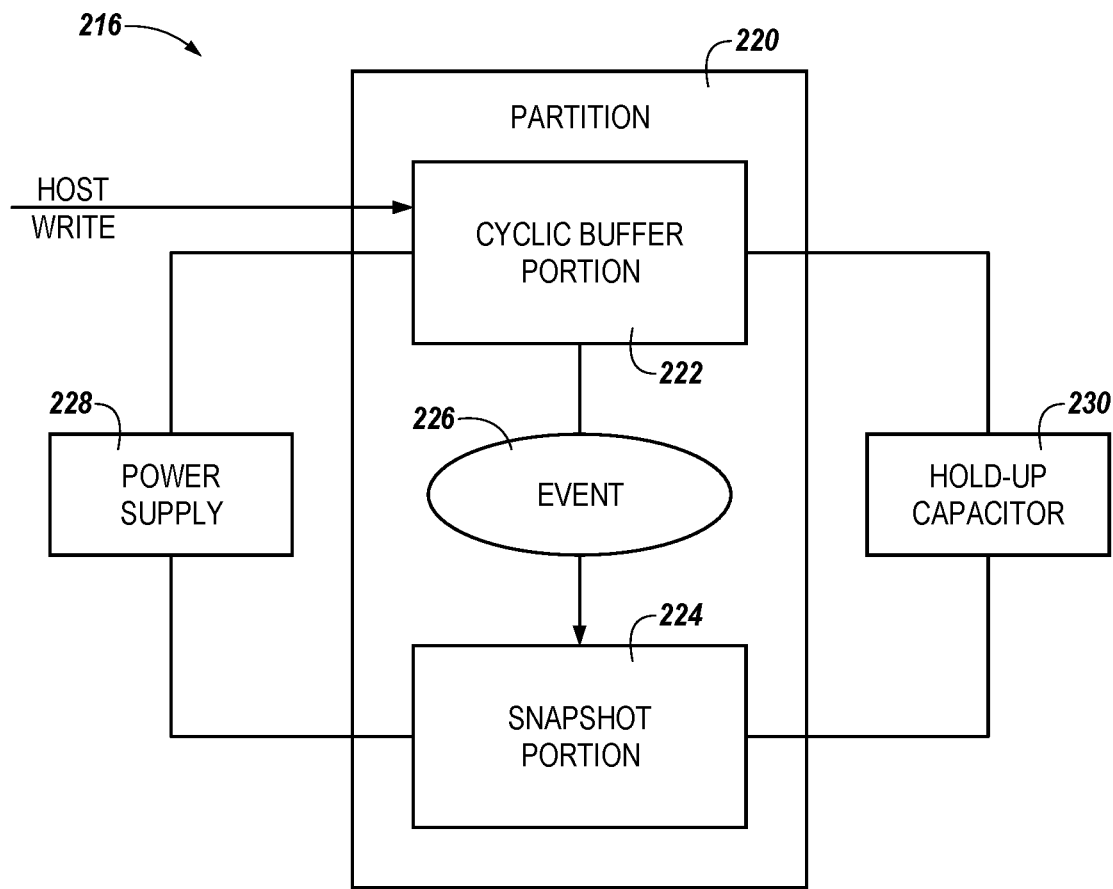
FIG. 2 illustrates an example of a partition including a cyclic buffer portion and a snapshot portion within a memory device in accordance with some embodiments of the present disclosure.

FIG. 2 illustrates an example of a partition 220 including a cyclic buffer portion 222 and a snapshot portion 224 within a memory device 216 in accordance with some embodiments of the present disclosure. The memory device 216 is analogous to the non-volatile memory device 116 illustrated in FIG. 1. The cyclic buffer portion 222 and snapshot portion 224 are part of of the partition 220. The use of the term "portion" with respect to "cyclic buffer portion 222" and "snapshot portion 224" does not imply that a certain region of blocks are devoted to either. In general, any portion of the memory within the partition 220 can be used for either portion. Host data can be received by the memory sub-system. The host data can be time based telemetric sensor data from different sensors of a vehicle. The time based telemetric sensor data from the different sensors can be aggregated by the host and sent to the memory sub-system at a data rate. The host data can be received by the memory sub-system and stored in the cyclic buffer portion 222 of the non-volatile memory device 216. As the cyclic buffer portion 222 is filled with host data, new data received from the host is stored sequentially, but older data in the cyclic buffer portion 222 can be erased or overwritten. The cyclic buffer portion 222 can therefore operate as a first-in-first-out (FIFO) buffer, where newly received data replaced the oldest data therein.

The cyclic buffer portion 222 can be coupled to the snapshot portion 224. Upon occurrence of a trigger event 226, an amount of the time based telemetric sensor data from the cyclic buffer portion 222 can be copied to the snapshot portion 224. The amount of host data corresponding to a defined period of time, which may be referred to as a playback time (e.g., 30 seconds), is referred to as a snapshot size and the data itself over that defined period of time is referred to as a snapshot. The snapshot size can be predefined for a period of time immediately preceding a trigger event. The snapshot size and/or playback time can be a predefined value programmed to the memory sub-system by a manufacturer, supplier, or user of the memory sub-system. In some embodiments, the determination that the trigger event 226 has occurred can include actuation of a trigger signal based at least in part upon received sensor information from a host that is above a threshold, such as a quantitative value.

The cyclic buffer portion 222 can store significantly more data over the service life of the non-volatile memory device 216 than the snapshot portion 224. For example, the cyclic buffer portion 222 can store 3-4 orders of magnitude (1,000-10,000 times) more data than the snapshot portion 224. However, the cyclic buffer portion 222 does not have to have a larger storage capacity than the snapshot portion 224. The size (amount of memory) of the cyclic buffer portion 222 can be dependent, at least in part, on an endurance capability of the cyclic buffer portion 222. For example, if a host is expected to write 150 petabytes (PB) of data to the cyclic buffer portion 222 (TBW is 150 PB) and the endurance capability of the cyclic buffer portion 222 is 5 million PEC, then 30 GB of memory for the cyclic buffer portion 222 is sufficient to satisfy the TBW of 150 PB, provided that data stored by the cyclic buffer portion 222 is overwritten. In contrast, if the endurance capability of the cyclic buffer portion 222 is 500 thousand PEC, then 300 GB of memory for the cyclic buffer portion 222 is necessary to satisfy the TBW of 150 PB. Thus, it can be beneficial to improve (increase) an endurance capability of the non-volatile memory device 216 (e.g., an endurance capability of the cyclic buffer portion 222) so that a higher TBW requirement can be satisfied with a smaller amount of memory. Reducing the amount of memory can reduce manufacturing costs, operating costs, and/or improve performance of the non-volatile memory device 216.

The size (amount of memory) of the snapshot portion 224 can be based on the rate at which data is to be received from the host, a playback time, and a quantity of snapshots that are desired to be available in the snapshot portion 224. The snapshot portion 224 can have sufficient storage to save [data rate from host (e.g., in GB/sec)*playback time (e.g., in sec)*desired quantity of snapshots (e.g., a whole number)]. In other words, the size of the snapshot portion 224 can be sufficiently large to store a desired number of snapshots. As used herein, the size of the snapshot portion 224 is referred to as "a user capacity" of the memory sub-system.

The memory sub-system can be configured to operate the cyclic buffer portion 222 with a first trim tailored to a performance target of the cyclic buffer portion 222. It is desirable for the cyclic buffer portion 222 to have the ability to store data relatively quickly because it needs to be able to keep up with the host data rate and the throughput demands of the time based telemetric sensor data. It is desirable for the cyclic buffer portion 222 to be able to handle a relatively large quantity of program/erase cycles compared to the snapshot portion 224. The performance target for the cyclic buffer portion 222 can be memory cell endurance. The memory sub-system can be configured to operate the snapshot portion 224 with a second trim tailored to a performance target of the snapshot portion 224. In contrast to the speed and endurance targets of the cyclic buffer portion 222, it is desirable for the snapshot portion to store data accurately and reliably because the snapshots are intended to be recoverable after a trigger event. The performance target of the snapshot portion 224 can be data retention.

The copying of a snapshot from the cyclic buffer portion 222 to the snapshot portion 224 can be powered by a power supply 228 of the memory sub-system under normal circumstances. However, copying of the snapshot from the cyclic buffer portion 222 to the snapshot portion 224 can be powered by a backup power supply, such as one or more hold-up capacitors 230 in response to a loss of system power (e.g., the power supply 228), which can be associated with the trigger event 226, such as a vehicle accident. In at least one embodiment, the loss of power from the power supply 228 can be the trigger event 226. A size and/or quantity of the hold-up capacitor(s) 230 are sufficient to provide enough power to copy one snapshot from the cyclic buffer portion 222 to the snapshot portion 224. As illustrated, the power supply 228 and the hold-up capacitor 230 are coupled to the cyclic buffer portion 222 and the snapshot portion 224. This indicates that the power supply 228 and the hold-up capacitor 230 are coupled to the memory device 216 to provide power therefor. There may not be a direct physical connection between either the power supply 228 or the hold-up capacitor 230 and the partition 220, but the power can be provided through write circuitry (not specifically illustrated).

In some embodiments, memory cells of the cyclic buffer portion 222 can be operated so as to store one bit per cell (SLC mode) and memory cells of the snapshot portion 224 can be operated so as to store more than one bit per cell. It can take longer to operate memory cells that store more than one bit per cell than to operate memory cells that store only one bit per cell. For example, an increased number of data states represented by the memory cells having multiple bits per cell can further increase complexity of an algorithm associated with programming, reading, and/or erasing the memory cells. Therefore, the memory cells programmed to store multiple bits per cell can have a different programming characteristic, such as a slower data transfer rate and/or longer programming time (e.g., time elapsed to program data to the memory cells), than that of the SLC memory cells and/or memory cells programmed to store fewer bits per cell. Memory cells of the cyclic buffer portion 222 can be operated with a faster programming time than a programming time for the memory cells of the snapshot portion 224.

Figure 3:
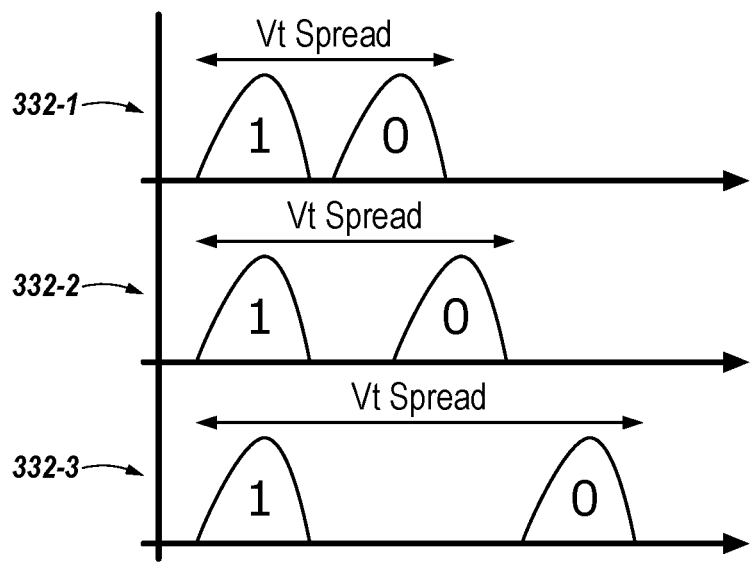
FIG. 3 illustrates different read windows in accordance with some embodiments of the present disclosure.

FIG. 3 illustrates different read windows 332-1, 332-2, 332-3 in accordance with some embodiments of the present disclosure. Although not specifically labeled as such, the horizontal axis represents the charge or voltage of the memory cell (the threshold voltage) and the vertical axis represents the quantity of memory cells for each data state (1 and 0) that are programmed to a particular voltage. The curves for each data state (1 and 0) therefore represent statistical distributions of memory cell threshold voltages for each data state. The arrows indicating the "Vt spread" (threshold voltage spread) indicate the distance between the Vt distributions along the horizontal axis (e.g., in volts). The Vt spread is also referred to as a read window. Although the arrows appear at the top of the distributions, they can represent any distance between the distributions, such as the worst case scenario at the bottom of each distribution where the distributions are widest and closest together.

Different trims can be used to operate the different portions of the non-volatile memory device. For example, the cyclic buffer portion can be operated with a first trim that provides a relatively small read window, such as the first read window 332-1 and the snapshot portion can be operated with a second trim that provides a relatively large read window, such as the third read window 332-3. As described herein, the cyclic buffer portion has relatively relaxed reliability requirements in comparison to the snapshot portion. A smaller spread of threshold voltages between data states, which is referred to herein as a read window, reduces the data reliability because it can be more difficult to distinguish between the data states. However, the smaller read window also reduces the rate of memory cell degradation over a number of program/erase cycles, which increases the memory cell endurance.

Figure 4:
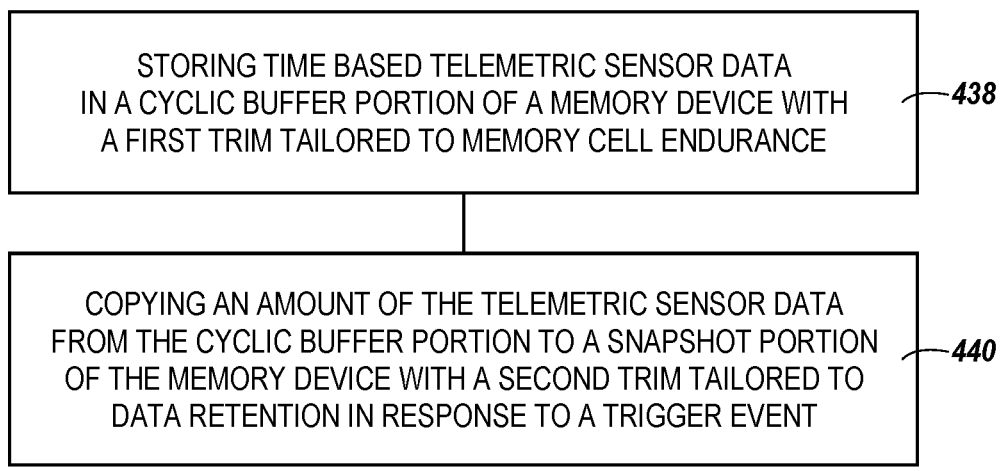
FIG. 4 is a flow diagram of an example method for storing data with separate trims for buffer and snapshot in accordance with some embodiments of the present disclosure.

FIG. 4 is a flow diagram of an example method for storing data with separate trims for buffer and snapshot in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, trim circuitry 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 438 in the example method of FIG. 4, time based telemetric sensor data can be stored in a cyclic buffer portion of a memory device (e.g., the non-volatile memory device 116 illustrated in FIG. 1) with a first trim tailored to memory cell endurance. Although embodiments are not so limited, the data can be received and stored at a rate of at least 1 GB/sec. The first trim can provide a relatively small read window.

At block 440 in the example method of FIG. 4, an amount (e.g., a snapshot) of the telemetric sensor data can be copied from the cyclic buffer portion (e.g., the cyclic buffer portion 222 illustrated in FIG. 2) to a snapshot portion (e.g., the snapshot portion 224 illustrated in FIG. 2) of the memory device with a second trim tailored to data retention in response to a trigger event. The second trim can provide a relatively large read window.

The method can include storing one bit per cell in memory cells of the cyclic buffer portion. In at least one embodiment, the method can include storing one or more bits per cell in memory cells of the snapshot portion in response to a hold-up capacitor (e.g., the hold-up capacitor 230 illustrated in FIG. 2) not providing power for the copy (e.g., where the method includes providing power for the copy from a system power supply). The method can include operating the memory cells of the cyclic buffer portion with a faster programming time than a programming time for the memory cells of the snapshot portion. In at least one embodiment, the method can include storing one bit per cell in memory cells of the snapshot portion in response to the hold-up capacitor providing power for the copy. The method can include providing power for the copy from the hold-up capacitor in response to a loss of system power associated with the trigger event.

Figure 5:
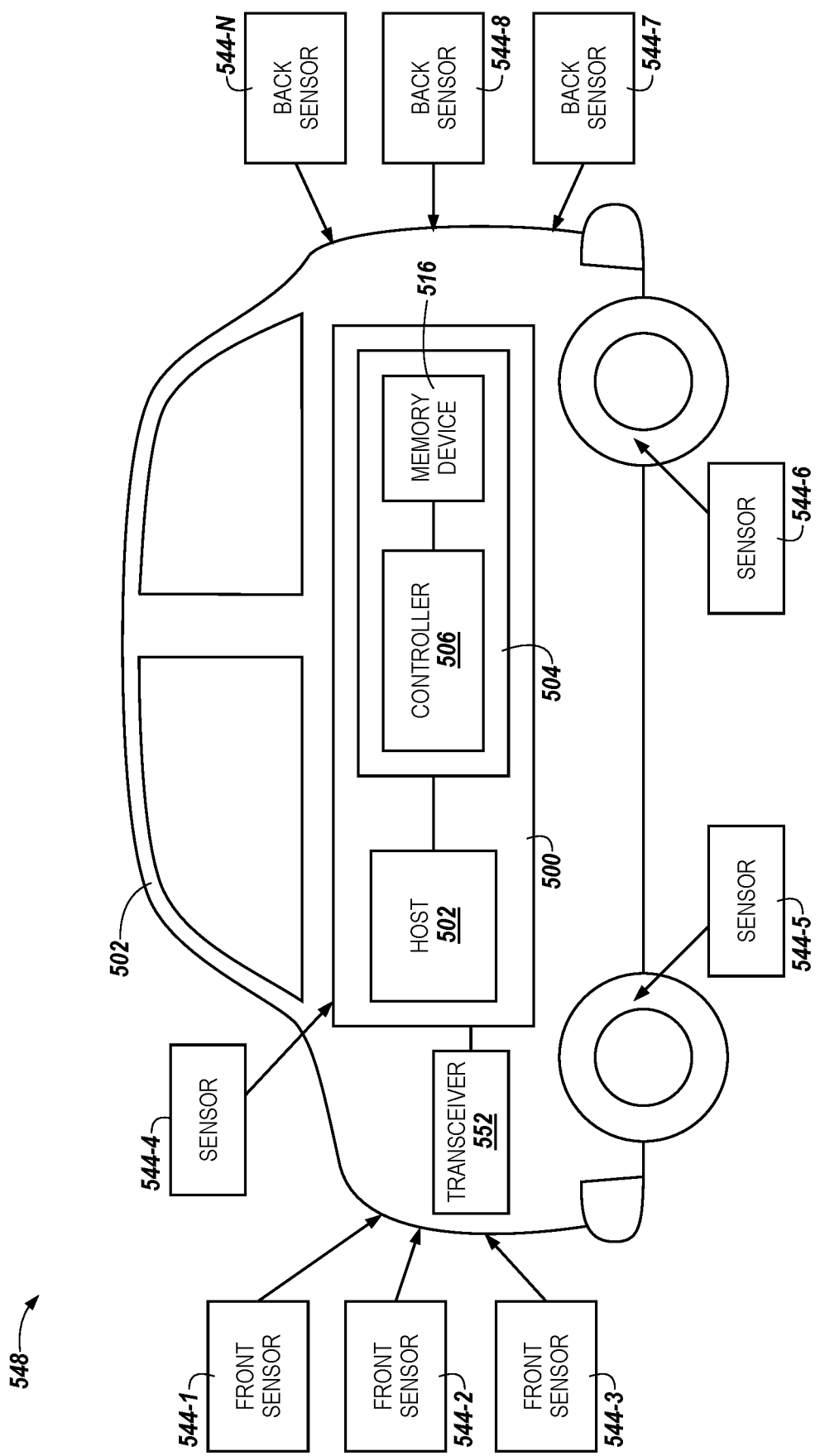
FIG. 5 illustrates an example of a system including a computing system in a vehicle in accordance with some embodiments of the present disclosure.

FIG. 5 illustrates an example of a system 548 including a computing system 500 in a vehicle 550 in accordance with some embodiments of the present disclosure. The computing system 500 can include a memory sub-system 504, which is illustrated as including a controller 506 and non-volatile memory device 516 for simplicity but is analogous to the memory sub-system 104 illustrated in FIG. 1. The computing system 500, and thus the host 502, can be coupled to a number of sensors 544 either directly, as illustrated for the sensor 544-4 or via a transceiver 552 as illustrated for the sensors 544-1, 544-2, 544-3, 544-5, 544-6, 544-7, 544-8, . . . , 544-N. The transceiver 552 is able to receive time based telemetric sensor data from the sensors 544 wirelessly, such as by radio frequency communication. In at least one embodiment, each of the sensors 544 can communicate with the computing system 500 wirelessly via the transceiver 552. In at least one embodiment, each of the sensors 544 is connected directly to the computing system 500 (e.g., via wires or optical cables). As used herein, telemetric sensor data means that the data is collected by sensors 544 that are remote from the memory sub-system 504 that stores the data (the receiving equipment). The telemetric sensor data is time based because the data is correlated with time. The time corresponding to each data point can either be stored with the telemetric data or derivable therefrom based on some metric, such as a known start time for the data and a data rate. The time can be useful in the playback of the sequences preceding an accident, for example.

The vehicle 550 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 544 are illustrated in FIG. 5 as including example attributes. For example, sensors 544-1, 544-2, and 544-3 are camera sensors collecting data from the front of the vehicle 550. Sensors 544-4, 544-5, and 544-6 are microphone sensors collecting data from the from the front, middle, and back of the vehicle 550. The sensors 544-7, 544-8, and 544-N are camera sensors collecting data from the back of the vehicle 550. As another example, the sensors 544-5, 544-6 are tire pressure sensors. As another example, the sensor 544-4 is a navigation sensor, such as a global positioning system (GPS) receiver. As another example, the sensor 544-6 is a speedometer. As another example, the sensor 544-4 represents a number of engine sensors such as a temperature sensor, a pressure sensor, a voltmeter, an ammeter, a tachometer, a fuel gauge, etc. As another example, the sensor 544-4 represents a video camera.

In some embodiments, the system 500 can be related to a braking system of the vehicle and can receive time based telemetric sensor data from to the camera sensors 544, the temperature sensors 544, and/or acoustic sensors 544. In some embodiments, the system 500 can be related to a heating/cooling system of the vehicle and can receive time based telemetric sensor data from temperature sensors 544 and/or acoustic sensors 544. In some embodiments, the system 500 can be related to an ambient noise system and can receive time based telemetric sensor data from acoustic sensors 544.

The host 502 can execute instructions to provide an overall control system and/or operating system for the vehicle 550. The host 502 can be a controller designed to assist in automation endeavors of the vehicle 550. For example, the host 502 can be an advanced driver assistance system controller (ADAS). An ADAS can monitor data to prevent accidents and provide warning of potentially unsafe situations. For example, the ADAS can monitor sensors in the vehicle 550 and take control of vehicle 550 operations to avoid accident or injury (e.g., to avoid accidents in the case of an incapacitated user of a vehicle). The host 502 may need to act and make decisions quickly to avoid accidents. The memory sub-system 504 can store reference data in the non-volatile memory device 516 such that time based telemetric sensor data from the sensors 544 can be compared to the reference data by the host 502 in order to make quick decisions.

Figure 6:
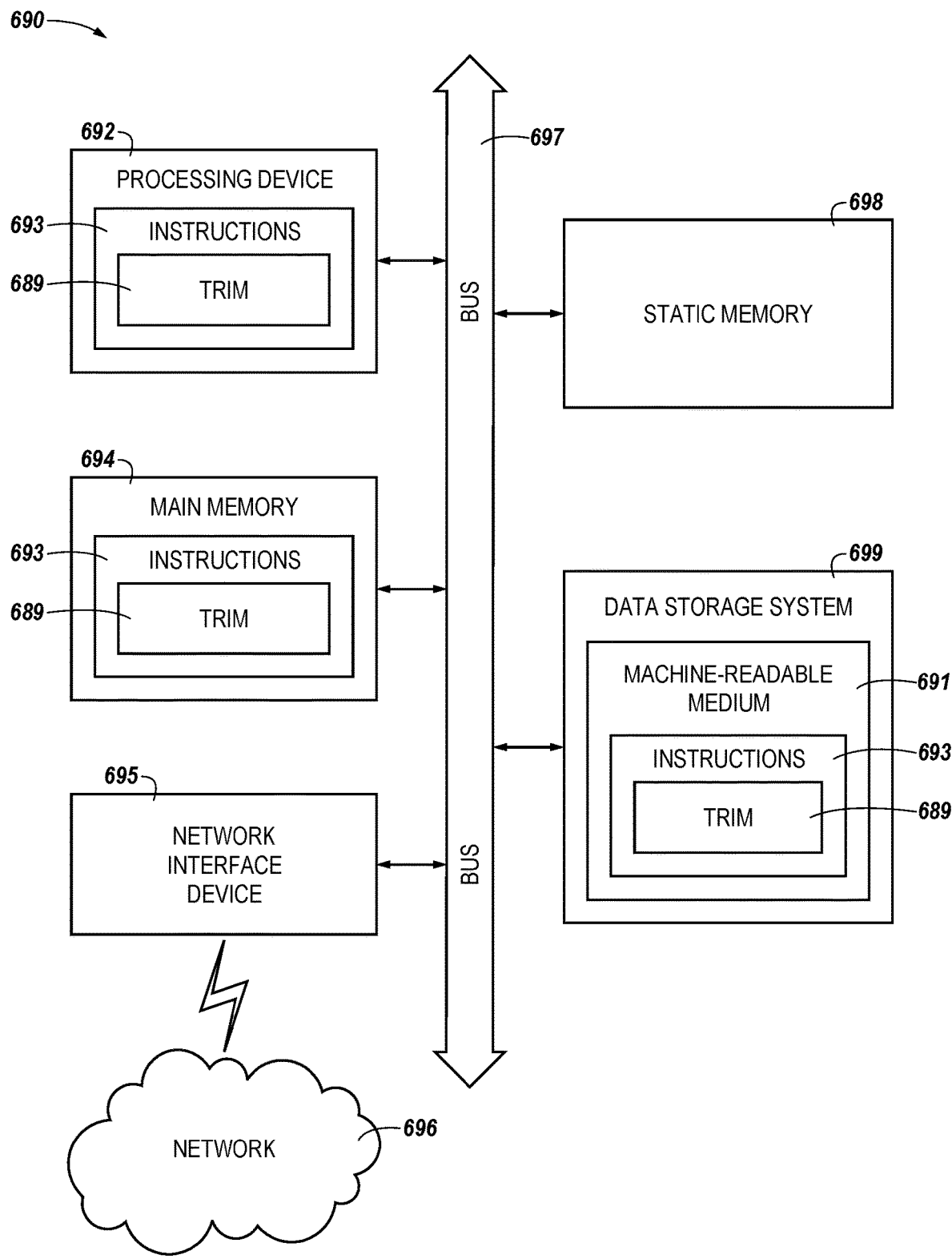
FIG. 6 is a block diagram of an example computer system in which embodiments of the present disclosure can operate.

FIG. 6 is a block diagram of an example computer system 690 in which embodiments of the present disclosure can operate. Within the computer system 690, a set of instructions, for causing a machine to perform one or more of the methodologies discussed herein, can be executed. The computer system 690 includes a processing device 692, a main memory 694, a static memory 698 (e.g., flash memory, static random access memory (SRAM), etc.), and a data storage system 699, which communicate with each other via a bus 697. The data storage system 699 is analogous to the memory sub-system 104 illustrated in FIG. 1.

The processing device 692 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 692 can also be one or more special-purpose processing devices such as an ASIC, an FPGA, a digital signal processor (DSP), network processor, or the like. The processing device 692 is configured to execute instructions 693 for performing the operations and steps discussed herein. The computer system 690 can further include a network interface device 695 to communicate over a network 696.

The data storage system 699 can include a machine-readable storage medium 691 (also known as a computer-readable medium) on which is stored one or more sets of instructions 693 or software embodying one or more of the methodologies or functions described herein. The instructions 693 can also reside, completely or at least partially, within the main memory 694 and/or within the processing device 692 during execution thereof by the computer system 690, the main memory 694 and the processing device 692 also constituting machine-readable storage media.

In one embodiment, the instructions 693 include instructions to implement functionality corresponding to the trim circuitry 112 of FIG. 1. The instructions 693 can include instructions to use multiple trims 689 tailored to performance targets for a cyclic buffer portion and a snapshot portion of a memory sub-system. The instructions 693 can include instructions to program memory cells of a cyclic buffer portion of a memory device with a relatively small read window to store time based telemetric sensor data and program memory cells of a snapshot portion of the memory device with a relatively large read window to store an amount of the telemetric sensor data from the cyclic buffer portion therein. The instructions 693 can further be executed to program the memory cells of the snapshot portion in response to a trigger event, such as a vehicle accident. The instructions 693 can be executed to program the memory cells of the cyclic buffer portion to store new time based telemetric sensor data. The instructions 693 can be executed to store one bit per cell in memory cells of the cyclic buffer portion, to store one or more bits per cell in memory cells of the snapshot portion in response to a hold-up capacitor not providing power therefor, and to store one bit per cell in memory cells of the snapshot portion in response to the hold-up capacitor providing power therefor.

While the machine-readable storage medium 691 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, ROMs, RAMs, EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a processing device;
a memory device coupled to the processing device, the memory device including a cyclic buffer portion and a snapshot portion; and
a hold-up capacitor coupled to the memory device;
wherein the processing device is to:
store time based telemetric sensor data as one bit per cell in memory cells in the cyclic buffer portion;
copy an amount of the telemetric sensor data from the cyclic buffer portion to the snapshot portion in response to a trigger event, wherein the processing device is to:
store one or more bits per cell in memory cells of the snapshot portion in response to the hold-up capacitor not providing power therefor; and
store one bit per cell in memory cells of the snapshot portion in response to the hold-up capacitor providing power therefor;
operate the cyclic buffer portion with a first trim tailored to a performance target of the cyclic buffer portion; and
operate the snapshot portion with a second trim tailored to a performance target of the snapshot portion.

2. The system of claim 1, wherein the performance target of the cyclic buffer portion comprises memory cell endurance; and
wherein the performance target of the snapshot portion comprises data retention.

3. The system of claim 2, wherein the processing device is further to sequentially store new time based telemetric sensor data in the cyclic buffer portion; and
erase older telemetric sensor data.

4. The system of claim 1, wherein the first trim provides a relatively small read window; and
wherein the second trim provides a relatively large read window.

5. The system of claim 1, wherein the cyclic buffer portion and the snapshot portion are within a same partition of the memory device.

6. The system of claim 1, wherein the memory device comprises non-volatile memory; and
wherein the hold-up capacitor is to provide power for the copy in response to a loss of system power associated with the trigger event.

7. The system of claim 6, wherein the system comprises a solid state drive to provide event recorder storage for an autonomous vehicle.

8. The system of claim 6, wherein the amount of the time based telemetric sensor data is predefined for a period of time immediately preceding the trigger event.

9. A method, comprising:
storing time based telemetric sensor data as one bit per cell in memory cells in a cyclic buffer portion of a memory device with a first trim tailored to memory cell endurance;
copying an amount of the telemetric sensor data from the cyclic buffer portion in response to a trigger event; and storing the copy as one or more bits per cell in memory cells of a snapshot portion of the memory device with a second trim tailored to data retention in response to a hold-up capacitor not providing power for the copy.

10. The method of claim 9, wherein storing time based telemetric sensor data in a cyclic buffer portion with the first trim provides a relatively small read window; and wherein copying the amount of the telemetric sensor data from the cyclic buffer portion to the snapshot portion with the second trim provides a relatively large read window.

11. The method of claim 9, further comprising operating the memory cells of the cyclic buffer portion with a faster programming time than a programming time for the memory cells of the snapshot portion.

12. The method of claim 9, further comprising providing power for the copy from a system power supply.

13. A non-transitory computer-readable storage medium comprising instructions that, when executed by a processing device, cause the processing device to:

program memory cells of a cyclic buffer portion of a memory device to store one bit per cell with a relatively small read window to store time based telemetric sensor data; and program memory cells of a snapshot portion of the memory device with a relatively large read window to store an amount of the telemetric sensor data from the cyclic buffer portion therein, wherein the instructions to program memory cells of the snapshot portion include instructions to:

store one or more bits per cell in memory cells of the snapshot portion in response to a hold-up capacitor not providing power therefor; and store one bit per cell in memory cells of the snapshot portion in response to the hold-up capacitor providing power therefor.

14. The medium of claim 13, wherein the instructions to program the memory cells of the snapshot portion comprise instructions to program the memory cells of the snapshot portion in response to a trigger event.

15. The medium of claim 14, wherein the trigger event comprises a vehicle accident.

16. The medium of claim 14, wherein the instructions to program the memory cells of the cyclic buffer portion comprise instructions to periodically program the memory cells of the cyclic buffer portion to store new time based telemetric sensor data.

17. A method, comprising:

storing time based telemetric sensor data as one bit per cell in memory cells in a cyclic buffer portion of a memory device with a first trim tailored to memory cell endurance; and copying an amount of the telemetric sensor data from the cyclic buffer portion in response to a trigger event; and storing the copy as one bit per cell in memory cells of a snapshot portion of the memory device with a second trim tailored to data retention in response to a hold-up capacitor providing power for the copy.

18. The method of claim 17, further comprising providing power for the copy from a hold-up capacitor in response to a loss of system power associated with the trigger event.

* * * * *